United States Patent
Shigley et al.

(10) Patent No.: US 11,846,256 B2
(45) Date of Patent: Dec. 19, 2023

(54) LIQUID ROCKET ENGINE ASSEMBLIES AND RELATED METHODS

(71) Applicant: Northrop Grumman Systems Corporation, Falls Church, VA (US)

(72) Inventors: John K. Shigley, Ogden, UT (US); Russell J. George, Pleasant View, UT (US); Martin Neunzert, Ogden, UT (US); Martin McCulley, West Haven, UT (US); Marc Hernandez, Ogden, UT (US); Robert K. Roberts, Willard, UT (US); Lauren F. Breitenbach, North Ogden, UT (US); Klaron Cramer, Pleasant View, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 17/318,167

(22) Filed: May 12, 2021

(65) Prior Publication Data
US 2021/0262417 A1    Aug. 26, 2021

Related U.S. Application Data

(63) Continuation of application No. 15/351,239, filed on Nov. 14, 2016, now Pat. No. 11,028,802.

(51) Int. Cl.
*F02K 9/97* (2006.01)
*F02K 9/62* (2006.01)
(Continued)

(52) U.S. Cl.
CPC ............... *F02K 9/97* (2013.01); *F02K 9/34* (2013.01); *F02K 9/343* (2013.01); *F02K 9/60* (2013.01);
(Continued)

(58) Field of Classification Search
CPC ..... F02K 9/34; F02K 9/343; F02K 9/97; F02K 9/978; F02K 9/60; F02K 9/62
See application file for complete search history.

(56) References Cited

U.S. PATENT DOCUMENTS 3,243,124 A * 3/1966 Lee .......................... F02K 9/84
                                                                        239/127.1
3,285,013 A    11/1966 Bell
(Continued)

FOREIGN PATENT DOCUMENTS

EP    1608863 B1    6/2012
FR    2832762 A1    5/2003
(Continued)

OTHER PUBLICATIONS

Braeunig, Rober, Rocket Propellants, 1996 (Year: 1996).
(Continued)

*Primary Examiner* — Kyle Robert Thomas
(74) *Attorney, Agent, or Firm* — TraskBritt

(57) ABSTRACT

A liquid rocket engine assembly comprising a thrust chamber, a nozzle, and a joint structure. The joint structure attaches the thrust chamber and the nozzle and comprises at least one seal element and an attachment ring interposed between the thrust chamber and the nozzle. Fasteners extend between the nozzle and the thrust chamber through the at least one seal element and the attachment ring. Materials of the thrust chamber and of the nozzle comprise different coefficients of thermal expansion. A method of forming a liquid rocket engine assembly is also disclosed.

17 Claims, 7 Drawing Sheets

(51) Int. Cl.
*F02K 9/34* (2006.01)
*F02K 9/60* (2006.01)

(52) U.S. Cl.
CPC ............... *F02K 9/62* (2013.01); *F02K 9/978* (2013.01); *F05D 2230/60* (2013.01); *F05D 2240/55* (2013.01); *F05D 2260/31* (2013.01)

(56) References Cited

U.S. PATENT DOCUMENTS

| | | | |
|---|---|---|---|
| 3,570,768 A * | 3/1971 | Conway | F02K 9/84 239/265.35 |
| 3,811,713 A * | 5/1974 | Barrett | F16L 27/1004 285/226 |
| 3,936,058 A * | 2/1976 | Clark | F02K 9/84 277/634 |
| 4,047,667 A | 9/1977 | Mccullough et al. | |
| 4,047,740 A | 9/1977 | Young | |
| 4,649,701 A | 3/1987 | Wendel | |
| 4,852,347 A | 8/1989 | Reynolds et al. | |
| 5,780,157 A | 7/1998 | Tuffias et al. | |
| 6,086,692 A | 7/2000 | Hawkins et al. | |
| 6,205,661 B1 | 3/2001 | Ring | |
| 6,711,901 B1 | 3/2004 | Canfield et al. | |
| 6,817,184 B2 | 11/2004 | Groeber et al. | |
| 7,080,513 B2 | 7/2006 | Reichert | |
| 7,717,280 B2 | 5/2010 | Wallace et al. | |
| 7,740,948 B1 | 6/2010 | Alvin | |
| 7,980,057 B2 | 7/2011 | Facciano et al. | |
| 8,215,097 B2 | 7/2012 | Cover et al. | |
| 8,952,304 B2 | 2/2015 | Bellotte et al. | |
| 9,200,597 B1 | 12/2015 | Pinera | |
| 10,041,445 B2 | 8/2018 | Berdoyes et al. | |
| 2003/0136128 A1 | 7/2003 | Groeber et al. | |
| 2006/0144037 A1 | 7/2006 | Metcalfe et al. | |
| 2008/0134663 A1 | 6/2008 | Totani et al. | |
| 2008/0163976 A1 | 7/2008 | Lalande et al. | |
| 2008/0290191 A1 | 11/2008 | Facciano et al. | |
| 2013/0276426 A1 | 10/2013 | Mungas et al. | |
| 2014/0083081 A1 | 3/2014 | Bahn | |
| 2015/0369175 A1 | 12/2015 | Berdoyes et al. | |
| 2016/0084200 A1 | 3/2016 | Isaac et al. | |
| 2016/0084283 A1 | 3/2016 | Sisemore | |
| 2016/0237595 A1 | 8/2016 | Maxwell et al. | |
| 2019/0203662 A1 | 7/2019 | Pichon et al. | |

FOREIGN PATENT DOCUMENTS

| | | |
|---|---|---|
| FR | 3002289 A1 | 8/2014 |
| FR | 3008139 A1 | 1/2015 |
| GB | 1605006 | 12/1981 |
| GB | 2505629 B | 11/2014 |
| JP | 52-059389 | 5/1977 |
| JP | 52-162304 U | 12/1977 |
| JP | 57-016239 B2 | 4/1982 |
| JP | 2002-071065 A | 3/2002 |
| JP | 2006-249935 A | 9/2006 |
| JP | 2008-217575 A | 9/2008 |
| WO | 2014/149184 A2 | 9/2014 |
| WO | 2015/055928 A1 | 4/2015 |
| WO | 2018/002523 A1 | 1/2018 |

OTHER PUBLICATIONS

Ellis et al. "Development of a Carbon-Carbon Translating Nozzle Extension for the RL10B-2 Liquid Rocket Engine" Copyright 1997 by the American Institute of Aeronautics and Astronautics, Inc., pp. 1-14.

French Preliminary Search Report and Written Opinion for French Application No. 1760410, dated Aug. 3, 2020, 16 pages (with translation).

German Office Action for German Application No. 10 2017 219 822.2, dated Oct. 27, 2020, 10 pages with translation.

Japanese Notice of Reasons for Refusal for Japanese Application No. 2017-216989, dated Jan. 17, 2019, 6 pages with English translation.

Japanese Search Report for Japanese Application No. 2017-216989, dated Jan. 8, 2019, 24 pages with English translation.

Lacombe, et al "High temperature composite nozzle extensions, a mature and efficient technology to improve upper stage Liquid Rocket Engine performance" 43rd AIAA/ASME/SAE/ASEE Joint Propulsion Conference & Exhibit Jul. 8-11, 2007, Cincinnati, OH, pp. 1-19.

Moore et al., "Reusable Solid Rocket Motor—Accomplishments, Lessons, and a Culture of Success" Article, NASA Marshall Space Flight Center; Huntsville, Alabama, (2011), 28 pages.

SGL Group, Sigraflex-Products Manufactured from Flexible Graphite Foil, 2011, SGL Group (Year: 2011).

* cited by examiner

LIQUID ROCKET ENGINE ASSEMBLIES AND RELATED METHODS

CROSS-REFERENCE TO RELATED APPLICATION

This application is a continuation of U.S. patent application Ser. No. 15/351,239, filed Nov. 14, 2016, now U.S. Pat. No. 11,028,802, issued Jun. 8, 2021, the disclosure of which is hereby incorporated herein in its entirety by this reference.

TECHNICAL FIELD

Embodiments of the disclosure relate generally to liquid rocket engine assemblies, and to methods of forming the liquid rocket engine assemblies. More particularly, embodiments of the disclosure relate to liquid rocket engine assemblies including joint structures connecting thrust chambers to nozzles, and to related methods.

BACKGROUND

Liquid rocket engine assemblies utilize liquids, such as liquid hydrogen or liquid oxygen, as one or more of propellant sources, fuel sources, and oxidizer sources. The liquid rocket engine assemblies can be quickly fueled and refueled, and the relatively high density of liquids as propellant sources can facilitate the use of relatively smaller storage vessels. Conventional liquid rocket engine assemblies include a fuel tank, an oxidizer tank, pumps, a thrust chamber, and a nozzle. The fuel and oxidizer are pumped into the thrust chamber and combusted, producing high temperature and high pressure exhaust gases. The hot gases pass through the nozzle, accelerating the flow and producing sufficient thrust to propel a vehicle including the liquid rocket engine assembly.

Various components of the liquid rocket engine assemblies are made from different materials, which expand and contract at different rates when exposed to the high temperatures and high pressures during use and operation of the liquid rocket engine assemblies. The nozzle is conventionally made from a carbon-carbon (C—C) composite material, while the thrust chamber is made from metal, such as copper. The nozzle and thrust chamber are attached to one another by fasteners, such as metal fasteners. Since the nozzle, thrust chamber, and fasteners are made from different materials having markedly different coefficients of thermal expansion (CTE), the liquid rocket engine assembly may experience a loss in performance and integrity during its use and operation, particularly if the engine is cycled on and off repeatedly, creating wide temperature swings. The metal components shrink more than the carbon-carbon components since carbon-carbon has a lower CTE. To reduce this problem, various methods of cooling the components have been investigated. For instance, the thrust chamber and nozzle conventionally include cooling systems, such as regenerative cooling systems, that circulate the liquids (e.g., the liquid hydrogen or liquid oxygen) or water through a jacket or tubes surrounding the thrust chamber and nozzle. The heated liquids are then transported to the thrust chamber for combustion. To circulate the fuel and/or oxidizer for cooling purposes, the liquid rocket engine assemblies include various valves and tubing, which adds complexity and cost to the design.

It would, therefore, be desirable to achieve a more cost effective yet secure manner for attaching the nozzle and the thrust chamber to accommodate thermal expansion differences between adjacent, different materials and reduce, if not eliminate, the need for active cooling of liquid rocket engine assemblies. It is also desirable for gaps between the nozzle and the thrust chamber to be sealed.

BRIEF SUMMARY

Embodiments described herein include a liquid rocket engine assembly comprising a thrust chamber, a nozzle, and a joint structure. The joint structure attaches the thrust chamber and the nozzle and comprises at least one seal element, an attachment ring, and fasteners. The attachment ring is interposed between the thrust chamber and the nozzle and the fasteners extend between the thrust chamber and the nozzle through the attachment ring and the at least one seal element. Materials of the thrust chamber and of the nozzle comprise different coefficients of thermal expansion.

In additional embodiments, a method of forming a liquid rocket engine assembly is disclosed. The method comprises placing a joint structure comprising at least one seal element and an attachment ring between a nozzle and a thrust chamber. Fasteners are inserted through mutually aligned holes in the joint structure, the nozzle, and the thrust chamber and tightened in threaded bores of the thrust chamber. Materials of the thrust chamber and of the nozzle comprise different coefficients of thermal expansion.

DETAILED DESCRIPTION

Figure 1:
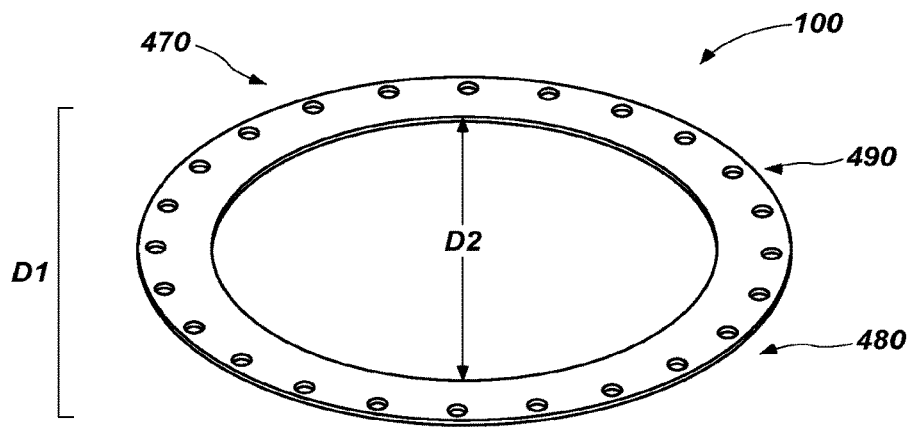
FIG. 1 is a simplified schematic of a seal element of a joint structure in a liquid rocket engine assembly according to an embodiment of the disclosure.

A joint structure for attaching (e.g., securing) a nozzle (e.g., an exit cone) and a thrust chamber of a liquid rocket engine assembly is disclosed. The nozzle and the thrust chamber are formed from materials having different coefficients of thermal expansion (CTE). The joint structure may be configured to accommodate the different rates of expansion or contraction of the materials of the nozzle and thrust chamber, reducing the potential for failure of the liquid rocket engine assembly. Despite the extreme temperature and pressure conditions, and variations, to which the liquid rocket engine assembly is exposed, the joint structure may secure the nozzle to the thrust chamber, may provide a seal between the nozzle and thrust chamber, and may insulate components of the liquid rocket engine assembly from the extreme temperatures and pressures. By appropriately selecting materials and configurations of the joint structure, separate cooling of the nozzle is not needed. The design of the liquid rocket engine assembly is simplified with such a joint structure, resulting in lower fabrication costs and shorter manufacturing times while providing better performance of the rocket engine assembly in operation. The configuration of the joint structure may be tailored specifically to the particular application for the liquid rocket engine assembly. For instance, factors such as operation temperature, operation pressure, operation time (e.g., burn time), possibility of using components repeatedly, and cost may affect the configuration of the joint structure. Oxidation protection of the nozzle is also disclosed.

The following description provides specific details, such as sizes, shapes, material compositions, and orientations in order to provide a thorough description of embodiments of the disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing a liquid rocket engine assembly. Only those process acts and structures necessary to understand the embodiments of the disclosure are described in detail below. Additional acts to form a complete liquid rocket engine assembly from the structures described herein may be performed by conventional fabrication and assembly processes.

Drawings presented herein are for illustrative purposes only, and are not meant to be actual views of any particular component, structure, or device. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, spatially relative terms, such as "beneath," "below," "lower," "bottom," "above," "over," "upper," "top," "front," "rear," "left," "right," "forward," "aft," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "over" or "above" or "on" or "on top of" other elements or features would then be oriented "below" or "beneath" or "under" or "on bottom of" the other elements or features. Thus, the term "over" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the terms "configured" and "configuration" refer to a size, shape, material composition, orientation, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

Figure 2:
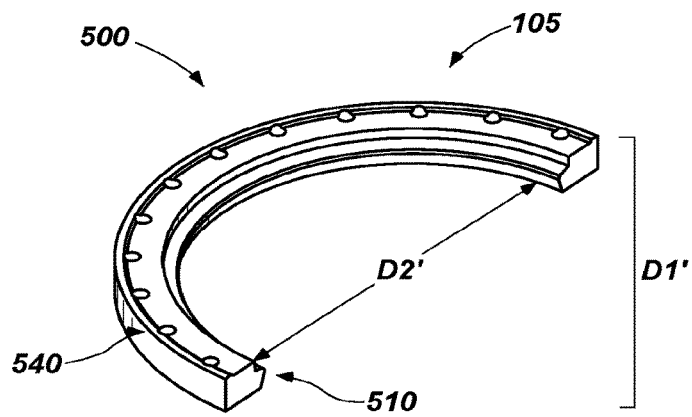
FIG. 2 is a simplified schematic of a segment of an attachment ring of the joint structure in the liquid rocket engine assembly according to an embodiment of the disclosure.
Figure 3:
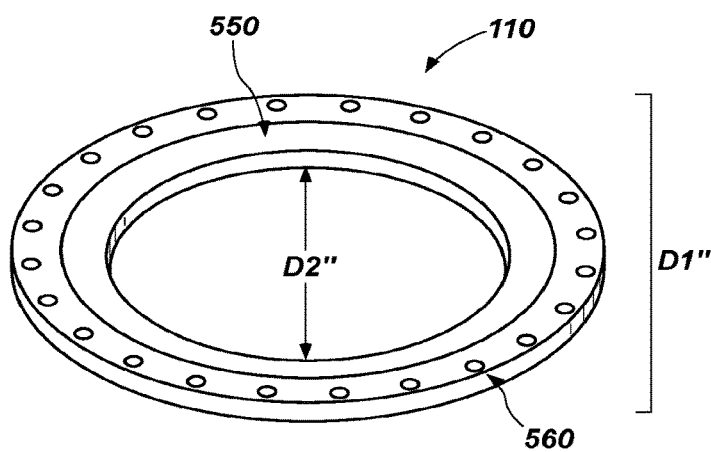
FIG. 3 is a simplified schematic of an insulation ring of the joint structure in the liquid rocket engine assembly according to an embodiment of the disclosure.

The joint structure of embodiments of the disclosure includes at least one seal element 100, segments 500 of an attachment ring 105, and, optionally, an insulation ring 110, as shown in FIGS. 1-3, respectively. The joint structure 410 also includes fasteners 420 for attaching the nozzle 430 and the thrust chamber 440 by inserting the fasteners 420 through the joint structure 410 and a flange 450 (see FIGS. 4-10) on the thrust chamber 440 and tightening the fasteners 420 in a threaded bore 445 in the flange 450. The joint structure 410 may also, optionally, include support ring 460. While embodiments of the disclosure may be described and illustrated herein as including a single joint structure 410, the liquid rocket engine assembly may include multiple joint structures 410 for securely attaching the nozzle 430 and the thrust chamber 440.

During use and operation, the nozzle 430, thrust chamber 440, joint structure 410, and flange 450 may be exposed to extreme temperature and pressure conditions. The joint structure 410 may be configured to withstand the temperature and pressure conditions for the expected burn time of the liquid rocket engine assembly, such as at least about 10 seconds, at least about 12 seconds, at least about 15 seconds, at least about 20 seconds, at least about 30 seconds, at least about 40 seconds, at least about 50 seconds, at least about 60 seconds, at least about 100 seconds, at least about 200 seconds, at least about 300 seconds, or at least about 600 seconds depending on the application for the liquid rocket engine assembly. Factors such as operation temperature, operation pressure, operation time (e.g., burn time), possibility of using components repeatedly, and cost may affect the configuration of the joint structure 410. In some embodiments, the joint structure 410 is configured for a burn time of at least about 100 seconds, at least about 200 seconds, or at least about 300 seconds.

Figure 6:
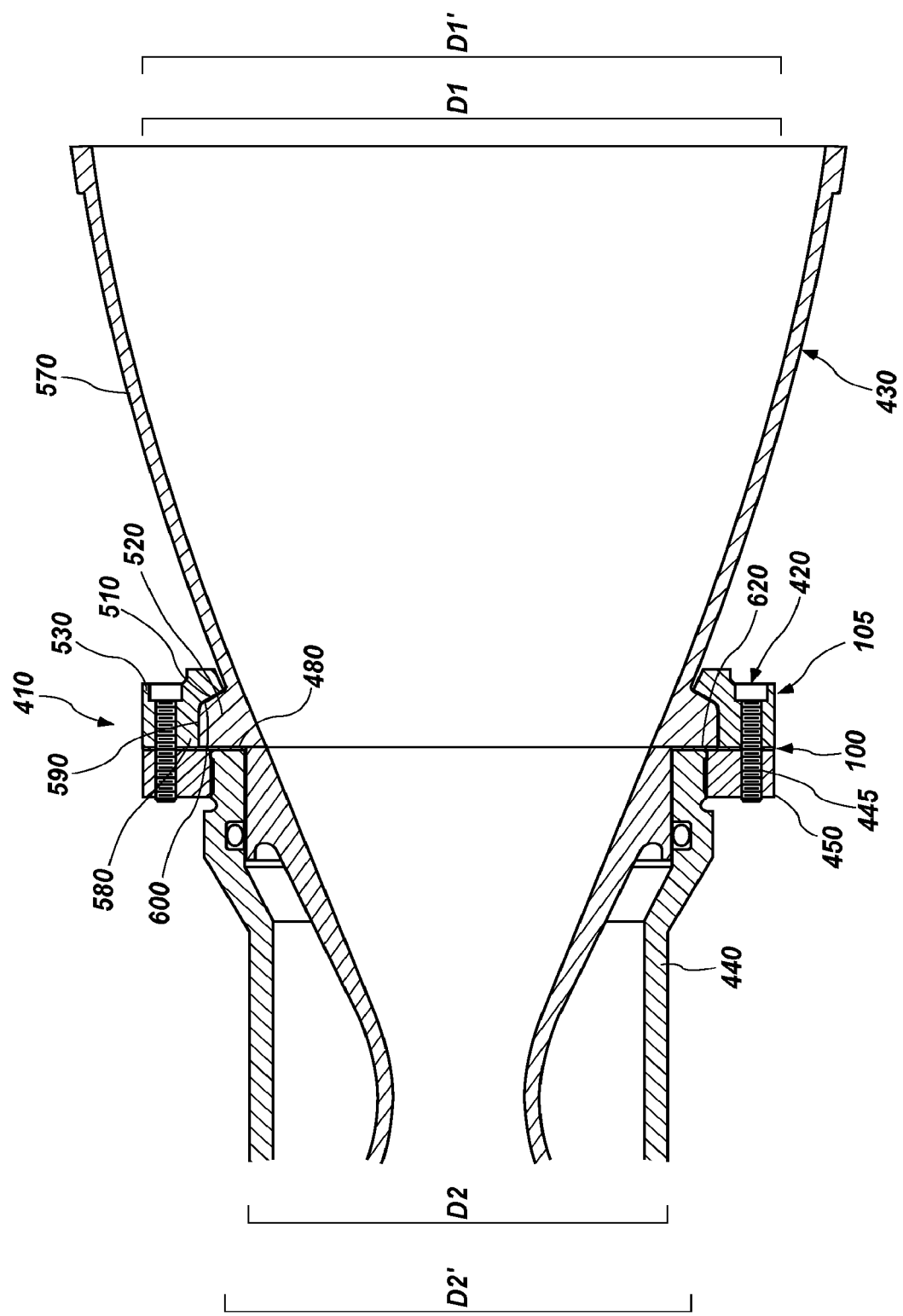
FIG. 6 is a simplified schematic of the joint structure in the liquid rocket engine assembly according to an embodiment of the disclosure.
Figure 7:
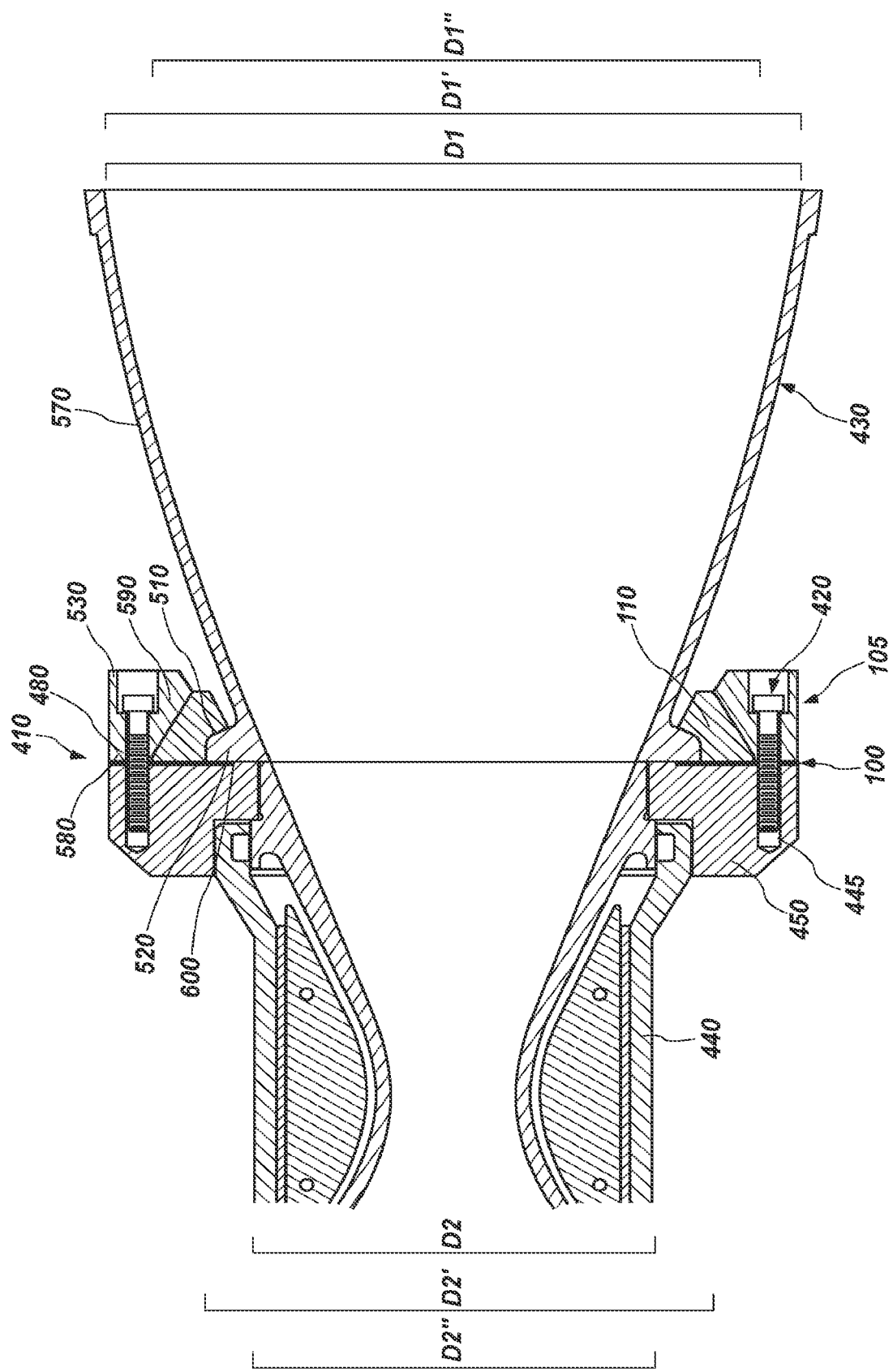
FIG. 7 is a simplified schematic of the joint structure in the liquid rocket engine assembly according to an embodiment of the disclosure.
Figure 8:
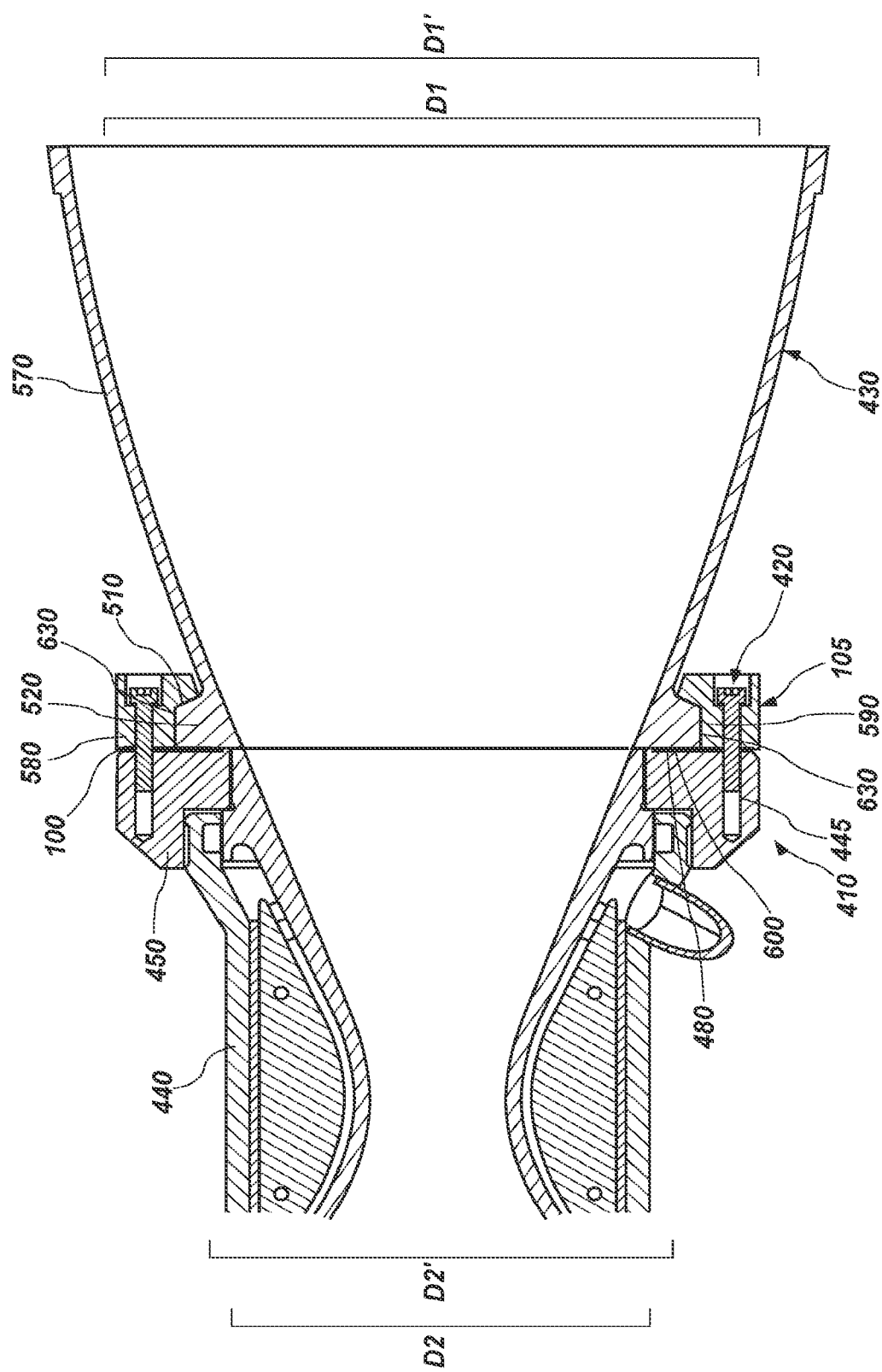
FIG. 8 is a simplified schematic of the joint structure in the liquid rocket engine assembly according to an embodiment of the disclosure.
Figure 9:
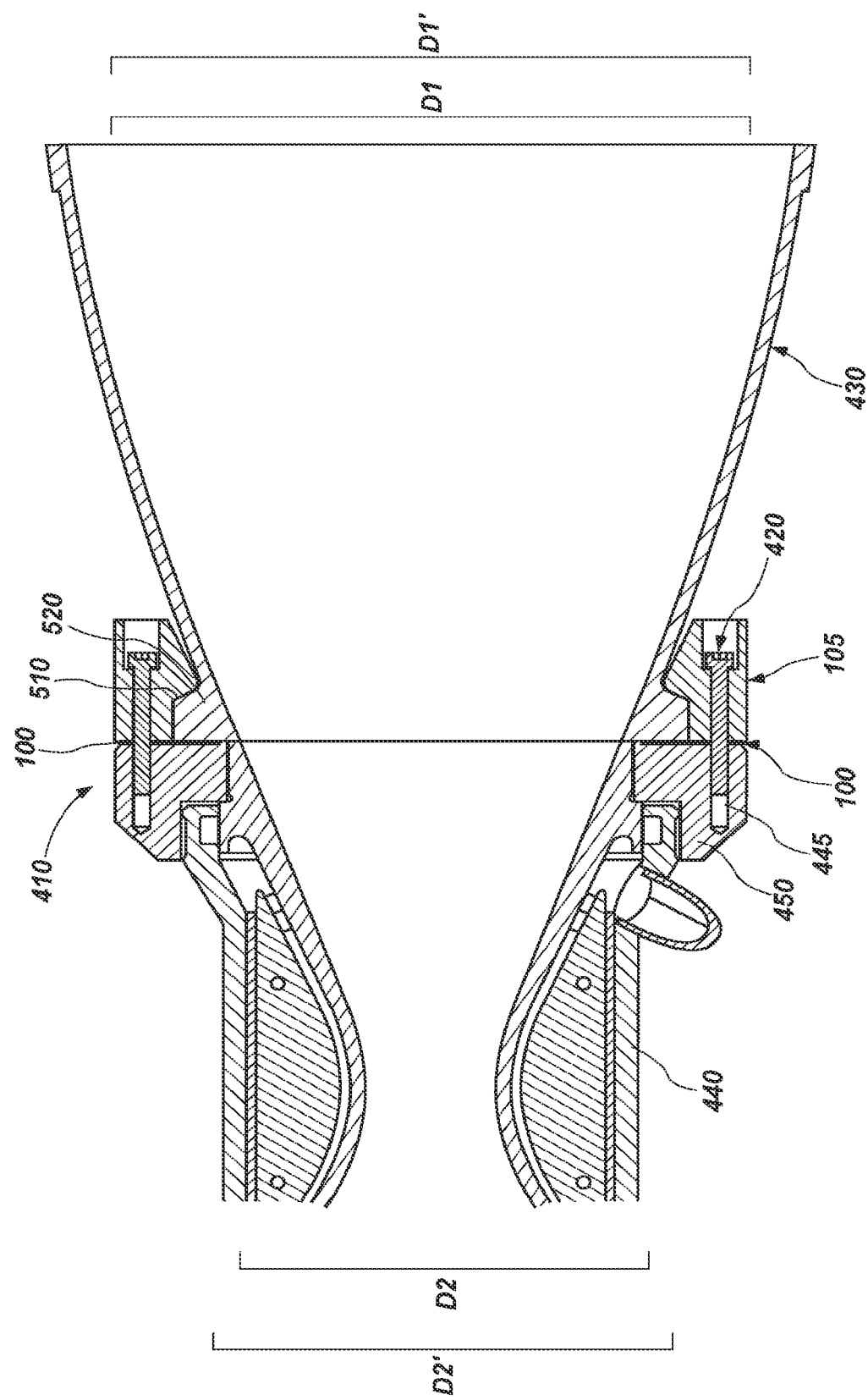
FIG. 9 is a simplified schematic of the joint structure in the liquid rocket engine assembly according to an embodiment of the disclosure.

Each of the seal element 100, the attachment ring 105, and the insulation ring 110, if present, may be appropriately sized and shaped to correspond to the size and geometry of the ends of the nozzle 430 and thrust chamber 440 to be attached to one another. As shown in FIGS. 1-3, the seal element 100, attachment ring 105, and insulation ring 110, if present, may be annular or substantially annular in shape. The seal element 100 and attachment ring 105 may have outer diameters D1, D1' that generally correspond to the outer diameters of the ends of the nozzle 430 and thrust chamber 440 to be attached to one another. As shown in FIGS. 6, 8, and 9, the inner diameters D2, D2' of the seal element 100 and attachment ring 105 may be substantially similar to one another and may correspond to the inner diameters of the ends of the nozzle 430 and thrust chamber 440. Alternatively, the inner diameters D2, D2' of the seal element 100 and attachment ring 105 may be different from one another, as shown in FIG. 7. For example, the inner diameter D2 of the seal element 100 may be smaller than the inner diameter D2' of the attachment ring 105. The insulation ring 110, if present, may have an outer diameter D1" that generally corresponds to the outer diameters of the ends of the nozzle 430 and thrust chamber 440 to be attached to one another. The outer diameter D1" of the insulation ring 110 may also generally correspond to the outer diameters D1, D1' of the seal element 100 and attachment ring 105.

Figure 5:
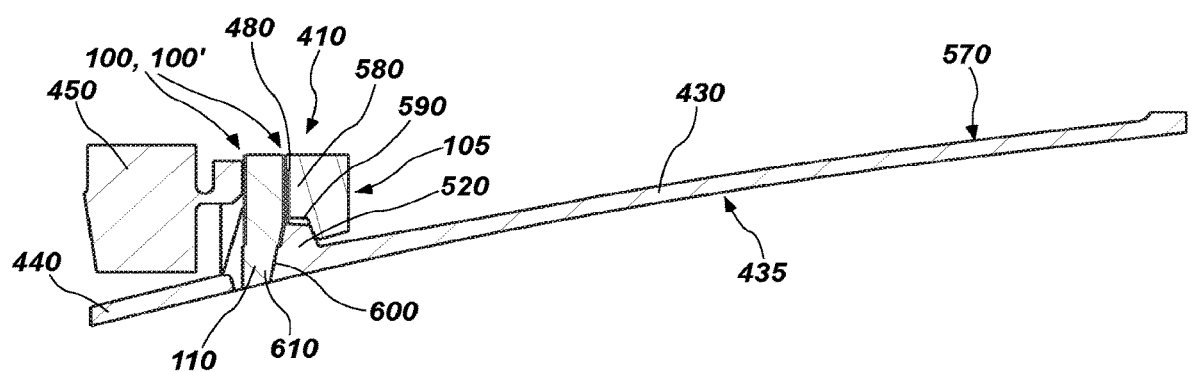
FIG. 5 is a simplified schematic of the joint structure in the liquid rocket engine assembly according to an embodiment of the disclosure.
Figure 10:
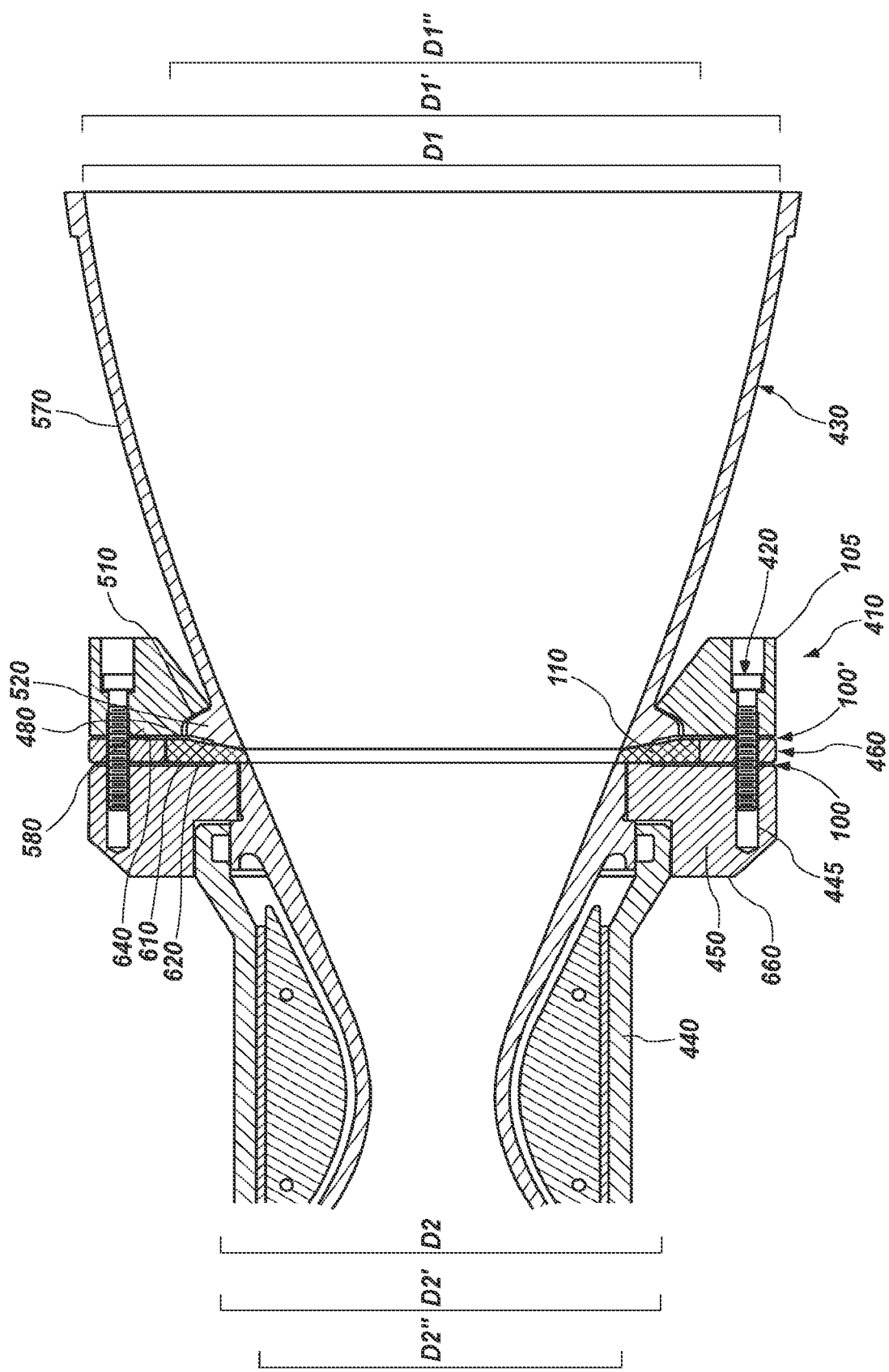
FIG. 10 is a simplified schematic of the joint structure in the liquid rocket engine assembly according to an embodiment of the disclosure.

The inner diameter (not shown) of the insulation ring 110 in FIG. 5 may be smaller than the inner diameters (not shown) of the seal element 100 and attachment ring 105. Alternatively, the insulation ring 110 may have an outer diameter D1" and an inner diameter D2" that is smaller than the respective outer and inner diameters D1, D1', D2, D2' of the seal element 100 and attachment ring 105, as shown in FIGS. 7 and 10.

The seal element 100 (see FIG. 1) may have substantially flat (e.g., planar) surfaces and a first (e.g., upper) surface 470 of the seal element 100 may be disposed proximal to the thrust chamber 440 while a second (e.g., lower), opposing surface 480 of the seal element 100 is disposed proximal to the attachment ring 105. The seal element 100 may be formed from a flexible material to seal gaps (e.g., splitlines) between the nozzle 430 and the thrust chamber 440 and may be resistant to the temperature and pressure conditions generated during use and operation of the liquid rocket engine assembly. The seal element 100 may also be resistant to corrosive or otherwise reactive combustion gases or byproducts formed during use and operation of the liquid rocket engine assembly. The seal element 100 may also protect the joint structure 410 from damage resulting from compressive forces applied during attachment of the nozzle 430 and during use and operation of the liquid rocket engine assembly. The seal element 100 may be formed to a thickness sufficient to seal the gaps between the nozzle 430 and the thrust chamber 440, which thickness may range from about 0.010 inch (about 0.254 mm) to about 0.100 inch (about 2.54 mm). In one embodiment, the seal element 100 has a thickness of about 0.050 inch (about 1.27 mm). The seal element 100 may be formed from a flexible graphite material, such as GRAFOIL® flexible graphite, which is commercially available from GrafTech International Holdings Inc. (Independence, Ohio). The seal element 100 may be formed into a desired shape by conventional techniques, such as machining, casting, etc., which are not described in detail herein. While embodiments herein may describe and illustrate the seal element 100 as a washer, the seal element 100 may be configured in another shape capable of sealing the gaps between the nozzle 430 and the thrust chamber 440. The seal element 100 may include holes 490 around its outer circumference through which the fasteners 420 are inserted and tightened in threaded bores 445 in the flange 450 to attach the nozzle 430 to the thrust chamber 440. The holes 490 may be appropriately sized and configured to align with corresponding holes 540 in the attachment ring 105 and in the insulation ring 110, if present. While twenty-four holes 490 are illustrated in FIG. 1, the number of holes 490 may be increased or decreased depending on the size, geometry and configuration of the joint structure 410 and flange 450.

The attachment ring 105 (see FIG. 2) may secure the joint structure 410 to the nozzle 430 and thrust chamber 440 and may also reduce a temperature to which neighboring metal components of the liquid rocket engine assembly are subjected. As shown in FIG. 2, the "C-shaped" segment 500 of the attachment ring 105 may include a ledge 510 proximal to an inner periphery thereof. The ledge 510 is sized and configured to accept a portion of an annular protrusion 520 (see FIGS. 4-10) of the nozzle 430 thereon. While FIG. 2 illustrates a single segment 500 of the attachment ring 105, the attachment ring 105 includes two "C-shaped" segments 500 (i.e., split segments) for ease of assembly of the joint structure 410 and the liquid rocket engine assembly. When inner diameters of the attachment ring 105 are referred to herein, the inner diameter refers to the distance between the ledge 510 of one segment 500 and the ledge 510 of the second segment 500. The attachment ring 105 may circumferentially surround a portion of the fasteners 420. The attachment ring 105 may be formed at a thickness sufficient to thermally insulate metal components of the liquid rocket engine assembly, such as a thickness of from about 0.050 inch (about 1.27 mm) to about 0.500 inch (about 12.7 mm). By way of example only, the thickness of the attachment ring 105 may be sufficient to thermally insulate the fasteners 420. For instance, the fasteners 420 may be flush with aft surface 530 of the attachment ring 105 or may be recessed within the attachment ring 105. The attachment ring 105 may be formed of a metal material, such as steel, a carbon phenolic material, a silica phenolic material, a yttria-stabilized zirconia (YSZ) material, a carbon-carbon material, a carbon cloth phenolic material, or a carbon-carbon plus silicon carbide material. The attachment ring 105 may have a 30° ply angle, 15° ply angle, or 0° ply angle. The attachment ring 105 is formed into a desired shape by conventional techniques, such as machining, casting, etc., which are not described in detail herein. The attachment ring 105 may include holes 540 around its outer circumference through which the fasteners 420 are inserted and tightened in threaded bores 445 in the flange 450 to secure the nozzle 430 and thrust chamber 440. The holes 540 may be appropriately sized and configured to align with corresponding holes 490, 560 in the seal element 100 and insulation ring 110, if present. While twelve holes 540 are illustrated in FIG. 2, the number of holes 540 may be increased or decreased depending on the size, geometry and configuration of the flange 450 and joint structure 410.

The attachment ring 105 may be disposed distal to the thrust chamber 440 (i.e., proximal to the nozzle 430) and below the seal element 100 and the insulation ring 110, if present, (see FIGS. 5, 6, 8, and 9). Alternatively, the attachment ring 105 may be disposed distal to the thrust chamber 440 (i.e., proximal to the nozzle 430) and below the seal element 100, and laterally adjacent to the insulation ring 110 (see FIG. 7). Alternatively, the attachment ring 105 may be disposed distal to the thrust chamber 440 (i.e., proximal to the nozzle 430) and below the seal element 100, and spaced apart from the insulation ring 110, such as by support ring 460 (see FIG. 10).

The material selected for the attachment ring 105 may affect the failure rate of the metal components of the liquid rocket engine assembly. Depending on the material selected, the liquid rocket engine assembly may be tailored for operating for longer action times or for shorter action times. By way of example only, if the carbon phenolic material or silica phenolic material is used, the liquid rocket engine assembly may be operated for up to about 240 seconds. If the carbon-carbon plus silicon carbide material is used, the liquid rocket engine assembly may be operated for greater than about 600 seconds. If the attachment ring 105 is formed of the YSZ material, any neighboring metal components, such as the fasteners 420, may be exposed to the desired operating temperatures and pressures and experience a reduced failure rate. The liquid rocket engine assembly may, therefore, be used for longer amounts of time since the metal components are protected from failure due to heat exposure.

Depending on the application of the liquid rocket engine assembly, the attachment ring 105 may be cured or post-cured. For a liquid rocket engine assembly configured for a longer burn time, the attachment ring 105 may be post-cured (e.g., heat-treated after curing) to minimize decomposition of the material of the attachment ring 105. It has been found that the cured materials of the attachment ring 105 may produce combustible decomposition products. However, if the material of the attachment ring 105 is post-cured, such as being heated to a temperature of about 300° F., about 400° F., or about 500° F., the production of combustible decomposition products may be reduced, which increases the burn time of the liquid rocket engine assembly.

The insulation ring 110 (see FIG. 3), if present, may be disposed between the seal element 100 and the attachment ring 105 (see FIG. 5), disposed between the attachment ring 105 and the nozzle 430 (see FIG. 7), or disposed axial to the nozzle 430 (see FIG. 10). The insulation ring 110 may insulate metal components of the liquid rocket engine assembly by reducing an effective temperature to which the components are exposed. The insulation ring 110 may be formed of a carbon phenolic material or a YSZ material into a desired shape by conventional techniques, such as machining, casting, etc., which are not described in detail herein. The insulation ring 110 may include angled surfaces 550 (see FIG. 3) proximal to an inner periphery thereof. The angled surfaces 550 of the insulation ring 110 seal with the second (e.g., lower) surface 480 of the seal element 100 when the fasteners 420 are tightened. In one embodiment, the insulation ring 110 is formed of a carbon cloth phenolic. The insulation ring 110 may be formed at a thickness sufficient to thermally insulate the metal components of the liquid rocket engine assembly, such as a thickness of from about 0.050 inch (about 1.27 mm) to about 0.500 inch (about 12.7 mm). In one embodiment, the insulation ring 110 is formed at a thickness of about 0.100 inch (2.54 mm). In some embodiments, the inner and outer diameters of the insulation ring 110 may be less than the inner and outer diameters of the seal element 100 and attachment ring 105 while in other embodiments, the inner and outer diameters of the insulation ring 110 may be substantially the same as the inner and outer diameters of the seal element 100 and attachment ring 105.

The insulation ring 110 may include holes 560 (see FIG. 3) around its circumference to secure the nozzle 430 and the thrust chamber 440. The holes 560 may be appropriately sized and configured to align with corresponding holes 490 in the seal element 100 and holes 540 of the attachment ring 105. The fasteners 420 may be inserted through the holes 560 and tightened in aligned, threaded bores 445 in the flange 450 to secure the nozzle 430 and thrust chamber 440. However, in other embodiments, the insulation ring 110 may be held in place by pressure on the seal element 100 and attachment ring 105 exerted by tightening the fasteners 420.

The insulation ring 110 may be cured or post-cured depending on the intended application. For liquid rocket engine assemblies needing longer burn times (e.g., about 100 seconds or greater, about 200 seconds or greater, about 300 seconds or greater, about 400 seconds or greater, about 500 seconds or greater, or about 600 seconds or greater), the insulation ring 110 may be post-cured (e.g., heat treated after curing) to minimize decomposition of the material of the insulation ring 110. Without the heat treatment, the insulation ring 110 may decompose and produce volatile and combustible gaseous byproducts. However, for applications where shorter burn times (e.g., less than about 100 seconds) of the liquid rocket engine assemblies are needed, decomposition of the insulation ring 110 may be minimal.

To attach the nozzle 430 and the thrust chamber 440, the fasteners 420 may be inserted through the holes 540 in the attachment ring 105 (see FIG. 2), the holes 490 in the seal element 100 (see FIG. 1), and the holes 560 in the insulation ring 110 (if present) (see FIG. 3) and tightened to an appropriate torque. Since the seal element 100 is formed of a flexible material, tightening the fasteners 420 may seal any gaps between the nozzle 430 and the thrust chamber 440. In embodiments where a YSZ material is used for the insulation ring 110, the YSZ material may additionally seal any gaps between the nozzle 430 and the thrust chamber 440. The fasteners 420 may include, but are not limited to, screws or bolts. In one embodiment, the fasteners 420 are socket head cap screws. The fasteners 420 may be inserted into the attachment ring 105 from the aft side of the nozzle 430. A length of the fasteners 420 may be selected depending on the thickness of the joint structure 410, such as the thickness of the attachment ring 105, insulation ring 110 (if present), and seal element(s) 100. The diameter of the fasteners 420 may be selected depending on the structural load of the liquid rocket engine assembly. The fasteners 420 may be formed of a metal or metal alloy that is resistant to high temperatures, such as steel, an alloy of titanium zirconium molybdenum (TZM), or an alloy of nickel, chromium, tungsten, and molybdenum (HAYNES® 230). The fasteners 420 may be circumferentially surrounded by the attachment ring 105, the seal element(s) 100, the support ring 460, and, optionally, by the insulation ring 110.

Once tightened in threaded bores 445 in the flange 450, the fasteners 420 may be recessed relative to the aft surface 530 of the attachment ring 105. The degree of recessing may depend on the thickness of the attachment ring 105. In applications where the thickness of the attachment ring 105 is to be minimized, the fasteners 420 may be flush with the aft surface 530 of the attachment ring 105 or recessed into the attachment ring 105 to a small degree. The fasteners 420 may be recessed to a larger degree when the attachment ring 105 is formed at a greater thickness. By recessing the fasteners 420 relative to the aft surface 530 of the attachment ring 105, an effective temperature to which the fasteners 420 are exposed is reduced.

The nozzle 430 may be substantially frustoconical shaped, with inner sidewalls and outer sidewalls 570 defining the nozzle 430. At an end proximal to the thrust chamber 440, the outer sidewalls 570 of the nozzle 430 may include the protrusion 520 that engages with the ledge 510 of the attachment ring 105. The nozzle 430 may be formed of a C—C(carbon-carbon) material and include an optional carbon fiber reinforcement. The material of the nozzle 430 may have a low CTE. By way of example only, the carbon fiber reinforcement may include, but is not limited to, a rayon, stretch broken polyacrylonitrile (PAN), or stretch broken blended yarns of PAN and oxidized PAN fibers. The carbon fiber reinforcement may be two-dimensional (2D) or three-dimensional (3D). The nozzle 430 may be formed by conventional techniques, which are not described in detail herein. For instance, the C—C material may be tape-wrapped around a mandrel, and cured to form a carbon-cloth phenolic (CCP) preform. The preform may be machined to produce the nozzle 430 having a desired shape. After machining, the nozzle 430 may be post-cured (e.g., heat-treated) to reduce the amount of cure byproducts and to provide porosity for the release of decomposition products. The nozzle 430 may be further heat treated and densified to its desired density. The nozzle 430 may then be machined to its final shape. In one embodiment, the nozzle may be formed from a carbon filled, phenolic resin matrix on a PAN precursor carbon fabric, such as that available from Barrday Composite Solutions (Millbury, Mass.) as LR1406. The nozzle 430 may be further processed to its desired shape. As explained in more detail below, the nozzle 430 may include an optional oxidation coating to protect the nozzle 430 from the high temperature and pressure environment of the liquid rocket engine assembly.

By appropriately selecting the materials and configurations of the joint structure 410, the nozzle 430 may not need a separate, active cooling system. The nozzle 430 may, therefore, lack a separate cooling system while a cooling system may be present on the thrust chamber 440. Heat generated during use and operation of the liquid rocket engine assembly may be absorbed by the cooling system on the thrust chamber 440 and by components of the joint structure 410. Additionally, cooling of the nozzle 430 may occur by contact (e.g., conduction) between the nozzle 430 and the thrust chamber 440. Since no cooling system is present on the nozzle 430, the complexity and cost of the liquid rocket engine assembly is reduced.

The material of the thrust chamber 440 may be selected to withstand high temperatures and pressures produced during use and operation of the liquid rocket engine assembly and may have a high CTE. The thrust chamber 440 may be formed of a metal or a metal alloy, such as copper, a copper alloy, steel, a steel alloy, nickel, a nickel alloy, aluminum, or an aluminum alloy. In one embodiment, the thrust chamber 440 is formed of a steel alloy resistant to high temperatures. The thrust chamber 440 of the liquid rocket engine assembly may be configured for use with any liquid fuel and liquid oxidizer including, but not limited to, liquid oxygen, liquid propane, liquid methane, liquid hydrogen, liquid ammonia, liquid kerosene, refined propellant-1 (RP-1), nitrous oxide, hydrogen peroxide, or combinations thereof. The thrust chamber 440 may include the flange 450, such as a metal flange, for attachment to the nozzle 430. The flange 450 may be formed from conventional materials and have a conventional configuration and, therefore, is not discussed in detail herein. The liquid rocket engine assembly may include a cooling system (not shown), such as a regenerative cooling system, for the thrust chamber 440. Such cooling systems are known in the art and, therefore, are not described in detail herein.

By appropriately selecting the materials and configurations of the joint structure 410, the nozzle 430 and thrust chamber 440 of the liquid rocket engine assembly may be securely attached to one another. Even if materials start to degrade during use and operation of the liquid rocket engine assembly, force may remain on other components of the liquid rocket engine assembly due to the angled surfaces 550 of the insulation ring 110. By using materials having different CTEs, the force and the angled surfaces 550 may maintain the seal between the nozzle 430 and the thrust chamber 440 even as the materials of the other components expand. The angled surfaces 550 of the insulation ring 110 enable the joint structure 410 to tighten, thus maintaining the seal between the nozzle 430 and thrust chamber 440.

Conductivities and CTEs of materials used in the components of the liquid rocket engine assembly are listed below in Tables 1-8. For the conductivities, the k_major is with ply and the k_minor is across ply:

TABLE 1

Conductivities of SiC infiltrated Carbon-Carbon
SiC Infiltrated Carbon-Carbon (Orthotropic)

| Temperature, (° F.) | k_major (BTU/F-sec-in) | k_minor (BTU/F-sec-in) |
|---|---|---|
| 7.03E+01 | 7.00E−04 | 3.06E−04 |
| 5.00E+02 | 7.17E−04 | 2.78E−04 |
| 1.00E+03 | 6.67E−04 | 2.46E−04 |
| 2.00E+03 | 4.92E−04 | 2.54E−04 |
| 3.00E+03 | 3.46E−04 | 2.42E−04 |
| 4.00E+03 | 3.25E−04 | 2.43E−04 |
| 5.00E+03 | 3.50E−04 | 2.64E−04 |
| 6.00E+03 | 4.17E−04 | 3.33E−04 |

TABLE 2

CTEs of SiC infiltrated Carbon-Carbon
SiC Infiltrated Carbon-Carbon (Orthotropic)
Coefficient of Thermal Expansion

| Temperature (° F.) | CTE Inplane (in/in/° F.) | CTE Across Ply (in/in/° F.) |
|---|---|---|
| 70 | −2.4E−07 | 2.4E−06 |
| 2000 | 6.0E−07 | 3.4E−06 |
| 3000 | 8.5E−07 | 3.7E−06 |
| 3500 | 9.6E−07 | 3.8E−06 |

TABLE 3

Conductivities of Yttria-stabilized Zirconia

| Yttria Stabilized Zirconia (Isotropic) Temperature, ° F. | k (BTU/F-sec-in) |
|---|---|
| 7.50E+01 | 1.42E−05 |
| 2.00E+02 | 1.47E−05 |

TABLE 3-continued

Conductivities of Yttria-stabilized Zirconia

Yttria Stabilized
Zirconia (Isotropic)

| Temperature, °F. | k (BTU/F-sec-in) |
|---|---|
| 6.00E+02 | 1.44E−05 |
| 1.00E+03 | 1.31E−05 |
| 1.40E+03 | 1.35E−05 |
| 2.00E+03 | 1.50E−05 |
| 2.50E+03 | 1.64E−05 |
| 4.00E+03 | 2.12E−05 |

TABLE 4

CTEs of Yttria-stabilized Zirconia
Yttria Stabilized Zirconia (Isotropic)
Coefficient of Thermal Expansion

| Temperature (°F.) | CTE (in/in/°F.) |
|---|---|
| 75 | 5.2E−06 |
| 200 | 5.4E−06 |
| 400 | 5.4E−06 |
| 600 | 5.4E−06 |
| 800 | 5.4E−06 |
| 1000 | 5.4E−06 |
| 1200 | 5.4E−06 |
| 1400 | 5.6E−06 |
| 1600 | 5.6E−06 |
| 1800 | 5.8E−06 |
| 2000 | 5.8E−06 |
| 2500 | 6.8E−06 |
| 3000 | 7.2E−06 |
| 3500 | 7.5E−06 |
| 4000 | 7.9E−06 |

TABLE 5

Conductivities of Silica Cloth Phenolic
Silica Cloth Phenolic (Orthotropic)

| Temperature, °F. | k_major (BTU/F-sec-in) | k_minor (BTU/F-sec-in) |
|---|---|---|
| 7.03E+01 | 7.98E−06 | 4.66E−06 |
| 7.63E+01 | 8.01E−06 | 4.68E−06 |
| 3.40E+02 | 9.42E−06 | 5.58E−06 |
| 5.40E+02 | 1.04E−05 | 6.12E−06 |
| 1.04E+03 | 1.28E−05 | 7.72E−06 |
| 4.54E+03 | 1.28E−05 | 7.72E−06 |

TABLE 6

Conductivities of Carbon Cloth Phenolic
Carbon Cloth Phenolic (Orthotropic)

| Temperature, °F. | k_major (BTU/F-sec-in) | k_minor (BTU/F-sec-in) |
|---|---|---|
| 7.63E+01 | 1.53E−05 | 1.17E−05 |
| 1.00E+02 | 1.53E−05 | 1.17E−05 |
| 4.00E+02 | 1.92E−05 | 1.39E−05 |
| 5.00E+02 | 1.99E−05 | 1.39E−05 |
| 6.00E+02 | 2.04E−05 | 1.41E−05 |
| 8.00E+02 | 2.12E−05 | 1.41E−05 |
| 1.00E+03 | 2.18E−05 | 1.41E−05 |
| 1.50E+03 | 2.22E−05 | 1.41E−05 |
| 5.84E+03 | 2.22E−05 | 1.41E−05 |

TABLE 7

Conductivities of GRAFOIL ® flexible graphite
GRAFOIL ® (Orthotropic)

| Temperature, °F. | k_major (BTU/F-sec-in) | k_minor (BTU/F-sec-in) |
|---|---|---|
| 7.00E+01 | 1.85E−03 | 6.94E−05 |

TABLE 8

CTEs of GRAFOIL ® flexible graphite
GRAFOIL ® (Orthotropic)
Coefficient of Thermal Expansion

| Temperature (°F.) | CTE Along Length/Width (in/in/°F.) | CTE Through Thickness (in/in/°F.) |
|---|---|---|
| −65 | −4.0E−07 | 1.5E−05 |
| 70 | −2.0E−07 | 1.5E−05 |
| 2000 | −2.0E−07 | 1.5E−05 |
| 4000 | 5.0E−07 | 1.5E−05 |

In addition, by appropriately selecting the configuration of the joint structure 410, a contact point between the flange 450 and the attachment ring 105 may be achieved so that bending stresses are minimized during use and operation of the liquid rocket engine assembly. Thus, the liquid rocket engine assembly may be used in the high temperature and high pressure conditions without cracking at the contact point.

Figure 4:
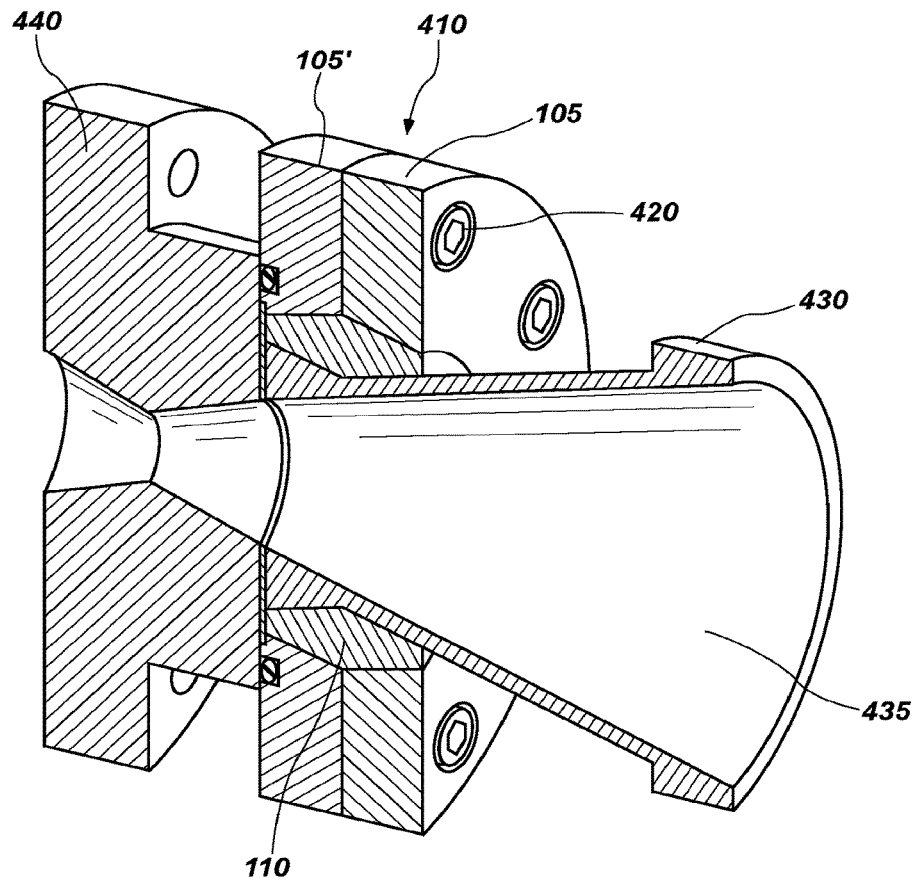
FIG. 4 is a simplified schematic of the joint structure in the liquid rocket engine assembly according to an embodiment of the disclosure.

An embodiment of a joint structure 410 is shown in FIG. 4, in which an insulation ring 110 circumferentially surrounds an upper portion of the nozzle 430 and attachment rings 105, 105' circumferentially surround the insulation ring 110. The insulation ring 110 is formed from a YSZ material and configured in a so-called "clam shell" shape, and the attachment rings 105, 105' are formed from steel. The fasteners 420 are inserted in holes 540 of the attachment rings 105, 105' (see FIG. 2) and tightened in threaded bores 445 in the flange 450 to attach the nozzle 430 to the thrust chamber 440. The insulation ring 110 is maintained in place by pressure on the attachment rings 105, 105' that is exerted by tightening the fasteners 420.

Another embodiment of a joint structure 410 is shown in FIG. 5 and includes two seal elements 100, 100', an insulation ring 110 disposed between the seal elements 100, 100', and an attachment ring 105 adjacent to the insulation ring 110. The seal elements 100, 100' are formed of GRAFOIL® flexible graphite, the insulation ring 110 is formed of a carbon phenolic material, and the attachment ring 105 is formed of a carbon phenolic material. The outer diameters of the seal elements 100, 100', the insulation ring 110, and the attachment ring 105 are substantially the same while the inner diameters of the seal elements 100, 100' are greater than the inner diameter of the insulation ring 110. The inner diameters of the seal elements 100, 100' are substantially the same as the inner diameter of the attachment ring 105. Thus, the insulation ring 110 contacts an outer sidewall 570 of the nozzle 430 while the seal elements 100, 100' do not contact the outer sidewall 570 of the nozzle 430. An forward surface 580 of the attachment ring 105 contacts a second surface 480 of the seal element 100', and side surfaces 590 of the attachment ring 105 contact the protrusion 520 and outer sidewall 570 of the nozzle 430. One of the seal elements 100' is in direct contact with a forward surface 600 of the protrusion 520, a forward surface 580 of the attachment ring 105, and an aft surface 610 of the insulation ring 110, while the other seal element 100 is in direct contact with the insulation ring 110 and the flange 450. The insulation ring 110 is in direct contact with and sandwiched between the seal elements 100, 100'. Fasteners (not shown) are inserted through holes (not shown) in the seal elements 100, 100', the insulation ring 110, the attachment ring 105, and into threaded bores 445 in the flange 450 on the thrust chamber 440 to attach the nozzle 430 and the thrust chamber 440.

Another embodiment of a joint structure 410 is shown in FIG. 6 and includes the seal element 100 and the attachment ring 105 circumferentially surrounding a portion of the fasteners 420. The outer diameters of the seal element 100 and attachment ring 105 are substantially the same while the inner diameter of the seal element 100 is less than the inner diameter of the attachment ring 105. Thus, the attachment ring 105 is in contact with the outer sidewall 570 of the nozzle 430 including the protrusion 520, while the seal element 100 does not contact the outer sidewall 570 of the nozzle 430. The forward surface 580 of the attachment ring 105 contacts second surface 480 of the seal element 100, and side surfaces 590 of the attachment ring 105, including the ledge 510, contact the protrusion 520 and the nozzle 430. The seal element 100 is in direct contact with the forward surface 600 of the protrusion 520 and with the flange 450. The fasteners 420 are inserted through holes 490 in the seal element 100 (see FIG. 1) and holes 540 in the attachment ring 105 (see FIG. 2), respectively, and into threaded bores 445 in the flange 450 on the thrust chamber 440 to attach the nozzle 430 to the thrust chamber 440. The side surface 590 of the attachment ring 105 proximal to the nozzle 430 extends further down the nozzle 430 than an outer surface of the attachment ring 105. By having a longer portion of the attachment ring 105 proximal to the nozzle 430, the attachment ring 105 may provide additional insulation to the fasteners 420. The fasteners 420 may be flush with the aft surface 530 of the attachment ring 105 or may be recessed relative to the aft surface 530 of the attachment ring 105. The attachment ring 105 is formed from a carbon phenolic material and the seal element is formed from GRAFOIL® flexible graphite.

Another embodiment of the joint structure 410 is shown in FIG. 7 and includes the seal element 100, the insulation ring 110, and the attachment ring 105. The seal element 100 and the attachment ring 105 circumferentially surround the fasteners 420. The insulation ring 110 is disposed laterally between the protrusion 520 of the nozzle 430 and the attachment ring 105. The outer diameters of the seal element 100 and attachment ring 105 are substantially the same while the inner diameter of the seal element 100 is less than the inner diameter of the attachment ring 105. Neither the seal element 100 nor the attachment ring 105 contacts the outer sidewall 570 of the nozzle 430. The forward surface 580 of the attachment ring 105 contacts the second surface 480 of the seal element 100, and side surfaces 590 of the attachment ring 105 contact the insulation ring 110, which is in direct contact with the protrusion 520 of the nozzle 430. The seal element 100 is in direct contact with the forward surface 600 of the protrusion 520, a forward surface 620 of the insulation ring 110, and the forward surface 580 of the attachment ring 105 and with the flange 450. The fasteners 420 are inserted through holes 490 in the seal element 100 (see FIG. 1), holes 540 in the attachment ring 105 (see FIG. 2), and into threaded bores 445 in the flange 450 on the thrust chamber 440 to attach the nozzle 430 to the thrust chamber 440. The insulation ring 110 may be maintained in position between the attachment ring 105 and nozzle 430 by forces exerted by the fasteners 420. The fasteners 420 may be recessed in the attachment ring 105 relative to the aft surface of the attachment ring 105. The attachment ring 105 is formed from a carbon-carbon material, the insulation ring 110 is formed from a YSZ material, and the seal element 100 is formed from GRAFOIL® flexible graphite. Since no metal components extend toward the nozzle 430 or thrust chamber 440, burn times of the liquid rocket engine assembly may be up to about 90 seconds.

Another embodiment of a joint structure 410 is shown in FIG. 8 and includes the seal element 100 and the attachment ring 105 circumferentially surrounding the fasteners 420. The outer diameters of the seal element 100 and attachment ring 105 are substantially the same while the inner diameter of the seal element 100 is less than the inner diameter of the attachment ring 105. Thus, the ledge 510 of the attachment ring 105 contacts the outer sidewall 570 of the nozzle 430 including outer surface 630 of the protrusion 520, while the seal element 100 does not contact the outer sidewall 570 of the nozzle 430 proximal to the forward surface 600 of the protrusion. The forward surface 580 of the attachment ring 105 contacts the second surface 480 of the seal element 100, and side surfaces 590 of the attachment ring 105, including the ledge 510, contact the outer surface 630 of the protrusion 520 and the nozzle 430. The seal element 100 is in direct contact with the forward surface 600 of the protrusion 520 and with the flange 450. The fasteners 420 are inserted through holes 490 in the seal element 100 (see FIG. 1) and holes 540 of the attachment ring 105 (see FIG. 2) and into threaded bores 445 in the flange 450 on the thrust chamber 440 to attach the nozzle 430 to the thrust chamber 440. The fasteners 420 may be recessed relative to the aft surface 530 of the attachment ring 105. By recessing the fasteners 420, the thickness of the attachment ring 105 may be minimized while still thermally insulating the fasteners 420. The attachment ring 105 is formed from a silica phenolic material and the seal element 100 is formed from GRAFOIL® flexible graphite.

Another embodiment of a joint structure 410 is shown in FIG. 9 and includes the seal element 100 and attachment ring 105 circumferentially surrounding the fasteners 420. The joint structure 410 is substantially as described above for FIG. 8. However, the attachment ring 105 extends further down the outer sidewall 570 of the nozzle 430 in an aft direction, enabling the fasteners 420 to be further recessed into the attachment ring 105 relative to the joint structure 410 in FIG. 8. Thus, the fasteners 420 may be additionally thermally insulated. Burn times of the liquid rocket engine assembly including the joint structure 410 may be up to about up to about 240 seconds. The attachment ring 105 is formed from a silica phenolic material and the seal element 100 is formed from GRAFOIL® flexible graphite.

Another embodiment of a joint structure 410 is shown in FIG. 10 and includes seal elements 100, 100', and the insulation ring 110 and the attachment ring 105 circumferentially surrounding the fasteners 420. The insulation ring 110 is sandwiched between a portion of the two seal elements 100, 100' and is disposed axial to the nozzle 430 and forward of the attachment ring 105. The joint structure 410 further includes the support ring 460 that is laterally adjacent to the insulation ring 110 and sandwiched between the two seal elements 100, 100'. The insulation ring 110 further shields the support ring 460 from heat during use and operation of the liquid rocket engine assembly. The outer diameters of the seal elements 100, 100', the support ring 460, and the attachment ring 105 are substantially the same while the inner diameters of the seal elements 100, 100' are less than the inner diameter of the attachment ring 105. The inner diameter of the support ring 460 is greater than the inner diameter of the attachment ring 105 and of the seal elements 100, 100'. The attachment ring 105 contacts the outer sidewalls 570 of the nozzle 430 including the protrusion 520, while the seal elements 100, 100' do not contact the outer sidewall 570 of the nozzle 430. The forward surface 580 of the attachment ring 105 directly contacts the second surface 480 of one of the seal elements 100', which is also in direct contact with an aft surface 640 of the support ring 460 and the aft surface 610 of the insulation ring 110. The other seal element 100 is in direct contact with the forward surface 620 of the insulation ring 110 and forward surface 660 of the support ring 460 and with the flange 450. The fasteners 420 are inserted through holes 490 in the seal elements 100, 100' (see FIG. 1), holes 540 in the attachment ring 105 (see FIG. 2), holes (not shown) in the support ring 460, and into threaded bores 445 in the flange 450 on the thrust chamber 440 to attach the nozzle 430 to the thrust chamber 440. The insulation ring 110 may be maintained in position between the attachment ring 105, support ring 460, and nozzle 430 by forces exerted by the fasteners 420. The fasteners 420 may be recessed into the attachment ring 105 relative to the aft surface 610 of the attachment ring 105. The attachment ring 105 is formed from a carbon-carbon material, the insulation ring 110 is formed from a YSZ material, the seal elements 100, 100' are formed from GRAFOIL® flexible graphite, and the support ring 460 is formed from a carbon phenolic material. Burn times of the liquid rocket engine assembly including the joint structure 410 may be up to about up to about 600 seconds.

To provide protection from oxidation during use and operation of the liquid rocket engine assembly, an inner surface 435 of the nozzle 430 may, optionally, include an oxidation coating. The oxidation coating may include, but is not limited to, silicon carbide, silicon-silicon carbide (Si+SiC), tantalum carbide, titanium carbide, hafnium carbide, zirconium silicate, zirconium boride, hafnium diboride, a tungsten alloy, an alloy of tungsten and rhenium, or combinations thereof. The oxidation coating may optionally include additives, such as additives resistant to ultra-high temperatures including, but not limited to, molybdenum disilicide ($MoSi_2$) or hafnium oxide ($HfO_2$). In one embodiment, the oxidation coating is a Si+SiC coating, with the Si and SiC present in approximately equal amounts. In another embodiment, the oxidation coating is a SiC coating. In one embodiment, the oxidation coating is a SiC coating with hafnium oxide, hafnium diboride, zirconium boride, or combinations thereof.

The oxidation coating may be applied to the inner surface 435 of the nozzle 430 (FIG. 5) by air plasma spray techniques, vacuum plasma spray techniques, polymer impregnation and pyrolysis techniques, which techniques are known in the art and not described in detail herein. In one embodiment, the oxidation coating is applied by air plasma spray. In another embodiment, the oxidation coating is applied by polymer impregnation and pyrolysis. In yet another embodiment, the oxidation coating is applied by vacuum plasma spray.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the disclosure as defined by the following appended claims and their legal equivalents.

What is claimed is:

1. A joint structure for attaching a thrust chamber and a nozzle of a rocket engine assembly, the joint structure comprising:
   two seal elements configured to be interposed between the thrust chamber and the nozzle;
   an insulation ring configured to be disposed between the two seal elements, the insulation ring comprising an angled surface configured to partially maintain a seal between the thrust chamber and the nozzle;
   an attachment ring configured to be disposed circumferentially around the thrust chamber and adjacent to an aft of the insulation ring; and
   fasteners configured to extend through the attachment ring and both seal elements of the two seal elements and to secure the joint structure to the thrust chamber and to the nozzle.

2. The joint structure of claim 1, wherein at least one seal element of the two seal elements or the attachment ring comprises an annular shape.

3. The joint structure of claim 1, wherein at least one seal element of the two seal elements comprises a flexible material.

4. The joint structure of claim 1, wherein the attachment ring is separate and discrete from the nozzle, and wherein a flange element forms an integral part of the thrust chamber.

5. The joint structure of claim 1, further comprising a support ring laterally adjacent to the insulation ring and disposed at least partially between the two seal elements.

6. The joint structure of claim 1, further comprising a flange element of the thrust chamber, wherein the fasteners are configured to extend through the attachment ring, through both seal elements of the two seal elements, and into the flange element of the thrust chamber.

7. The joint structure of claim 6, wherein the attachment ring and the flange element are at least partially aligned in a direction at least substantially parallel to a longitudinal axis of the rocket engine assembly.

8. The joint structure of claim 1, wherein the fasteners, when extending through the attachment ring and both seal elements of the two seal elements, extend in a direction at least substantially parallel to a longitudinal axis of the rocket engine assembly.

9. A method of forming a liquid rocket engine assembly, the method comprising:
   placing a joint structure comprising two substantially flat seal elements including holes around an outer circumference thereof, an insulation ring, and an attachment ring at least partially between a nozzle and a thrust chamber, comprising:
   interposing the two seal elements at least partially between the thrust chamber and the nozzle;
   disposing the insulation ring between the two seal elements; and
   disposing the attachment ring circumferentially around the thrust chamber and adjacent to an aft of the insulation ring; and
   inserting fasteners through the holes in the attachment ring and both seal elements of the two seal elements.

10. The method of claim 9, further comprising positioning a support ring laterally adjacent to the insulation ring and at least partially between the two seal elements.

11. The method of claim 9, wherein inserting fasteners comprises inserting the fasteners completely through the attachment ring and both seal elements of the two seal elements and at least partially into a flange of the thrust chamber.

12. The method of claim 9, wherein inserting fasteners comprises inserting the fasteners to extend in a direction at least substantially parallel to a longitudinal axis of the liquid rocket engine assembly.

13. A liquid rocket engine assembly, comprising:
- a thrust chamber;
- a nozzle; and
- a joint structure disposed at least partially between the thrust chamber and the nozzle, the joint structure attaching the thrust chamber and the nozzle, the joint structure comprising:
  - an attachment ring disposed circumferentially around the thrust chamber;
  - a flange element of the thrust chamber;
  - two substantially flat seal elements, including holes around an outer circumference thereof, interposed at least partially between the thrust chamber and the nozzle and at least partially between the thrust chamber and the attachment ring;
  - an insulation ring disposed between the two seal elements; and
  - fasteners extending through the attachment ring and the holes of the two seal elements and securing the joint structure to the thrust chamber and to the nozzle.

14. The liquid rocket engine assembly of claim 13, further comprising a support ring laterally adjacent to the insulation ring and disposed at least partially between the two seal elements.

15. The liquid rocket engine assembly of claim 13, wherein the attachment ring is separate and discrete from the nozzle, and wherein the flange element forms an integral part of the thrust chamber.

16. The liquid rocket engine assembly of claim 13, wherein the attachment ring and the flange element are at least partially aligned in a direction at least substantially parallel to a longitudinal axis of the liquid rocket engine assembly.

17. The liquid rocket engine assembly of claim 13, wherein the fasteners extend in a direction at least substantially parallel to a longitudinal axis of the liquid rocket engine assembly.

* * * * *